United States Patent Office 3,365,444
Patented Jan. 23, 1968

3,365,444
5'-HYDROXYPREGNENO[3,2-c]PYRAZOLE DERIVATIVES AND PROCESS FOR THEIR PREPARATION
Colin C. Beard, Boulder, Colo., and Alexander D. Cross, Mexico City, Mexico, assignors to Syntex Corporation, Panama, Panama, a corporation of Panama
No Drawing. Continuation-in-part of application Ser. No. 486,226, Sept. 9, 1965. This application Dec. 15, 1966, Ser. No. 601,862
10 Claims. (Cl. 260—239.5)

This is a continuation-in-part of copending application Ser. No. 486,226 filed Sept. 9, 1965.

The present invention is related to novel steroids and particularly to certain substituted 6α,7α-difluoromethylenepregn-4-enes having a 1'-phenyl-5'-hydroxypyrazole group fused to the 2- and 3-position of the pregnene nucleus.

More specifically, the compounds of the present invention are represented by the following structural formula:

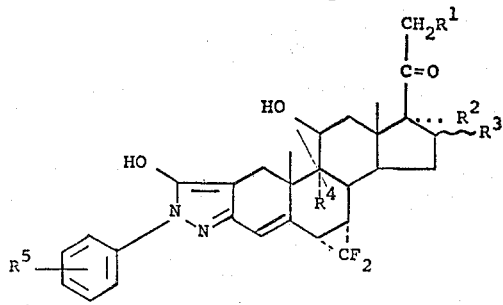

wherein $R^1$ is fluoro, hydroxy, or a hydrocarbon carboxylic acyloxy group;
$R^2$ is hydroxy or a hydrocarbon carboxylic acyloxy group;
$R^3$ is hydrogen or methyl;
$R^4$ is hydrogen or fluoro; and
$R^5$ is hydrogen, fluoro, chloro, methoxy or methyl.

It is apparent from the above formula that a tautomeric structure exists and while the enol form of the pyrazole ring is depicted, the keto form is also embraced by the present invention.

The hydrocarbon carboxylic acyl and acyloxy groups of the compounds of the present invention contain less than 12 carbon atoms and are of a straight, branched, cyclic or cyclic-aliphatic chain structure. This structure may be saturated, unsaturated, or aromatic and optionally substituted by functional groups such as hydroxy, alkoxy containing up to 5 carbon atoms, alkanoyloxy containing up to 12 carbon atoms, phenoxy, nitro, amino, halogeno, and the like. Typical esters thus include acetate, propionate, enanthate, benzoate, trimethylacetate, t-butylacetate, phenoxyacetate, cyclopentylpropionate, aminoacetate, β-chloropropionate, adamantoate and the like.

The compounds of the present invention possess high topical antiinflammatory activity and are accordingly useful for the treatment of dermatological inflammatory conditions such as contact dermatitis, eczematous dermatitis, pruritus ani, and the like. These compounds may be administered as therapeutic compositions in the form of solutions, suspensions, creams, ointments, powders and the like. Generally, in view of their high activity, the compositions will contain up to about 0.25% by weight of active steroid. As is customary, the precise dosage will be varied in relation to the specific condition being treated and for some uses, such as maintenance therapy of large areas or occlusive dressing therapy, compositions containing about 0.01% or less by weight are preferred. Various other therapeutic agents, as for example, antibiotics such as neomycin, may of course be included in suitable compositions. These compounds are also systemic antiinflammatory agents and are administered orally in the treatment of conditions usually responsive to corticoid therapy such as rheumatoid arthritis, allergies and the like.

The compounds of the present invention are prepared via the following reaction scheme.

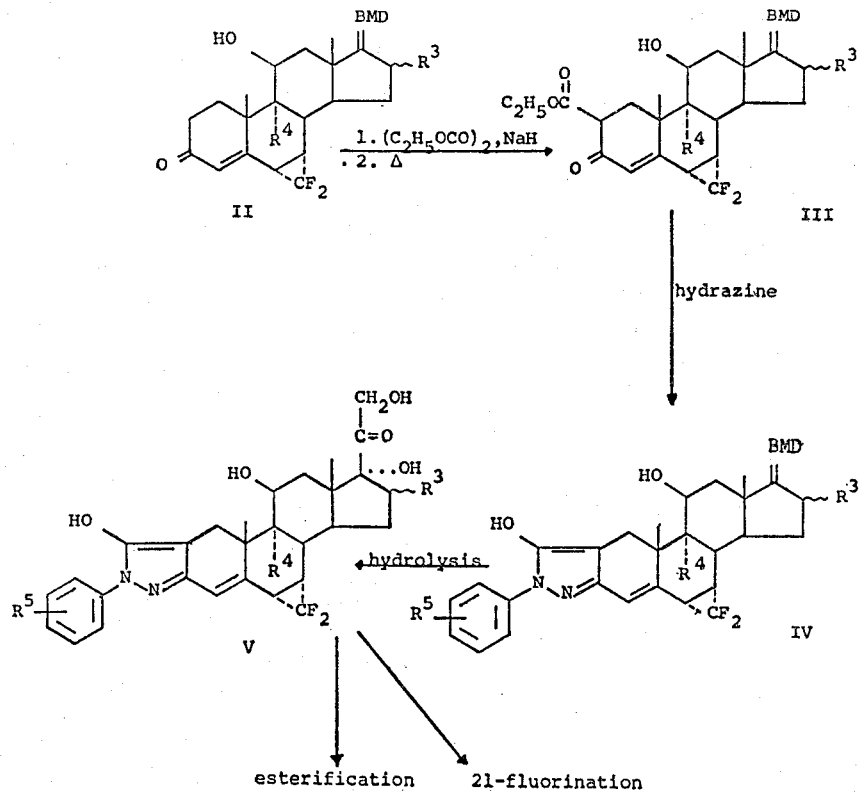

In the foregoing $R^3$, $R^4$ and $R^5$ are as defined above and "BMD" represents the bismethylenedioxy-protected dihydroxyacetone side chain of the pregnane series.

In accordance with the above route, a 3-keto-6α,7α-difluoromethylenepregn-4-ene of Formula II is first treated with diethyl oxalate in the presence of sodium hydride. Other dialkyl oxalates may alternatively be used. The reaction is conducted in an inert solvent, such as benzene under an inert anhydrous atmosphere as is provided, for example by dry nitrogen gas. In addition to the principal product, some of the corresponding 11-oxalate is also formed. This need not be separated and may be subjected to the following steps simultaneously with the free 11-hydroxy compound.

The product of this reaction is next pyrolyzed on glass powder with a resultant formation of a 2-carbethoxypregn-4-ene of Formula III.

Treatment of this 2-carbethoxypregn-4-ene of Formula III with phenylhydrazine or a substituted phenylhydrazine (the substituent on the phenyl ring being represented by $R^5$) in a lower alkanol solvent and an acid catalyst or in a liquid carboxylic acid then yields the 1′-phenyl-5′-hydroxypregn-4-eno[3,2-c]-pyrazole of Formula IV. A basic hydrolysis then serves to saponify any of the corresponding 11-oxalate which is present, thus providing a homogeneous product. Hydrolysis of the bismethylenedioxy protective group in the known manner with formic acid, hydrogen fluoride or the like then yields the free 6α,7α-difluoromethylene-11β,17α,21-trihydroxy - 20 - oxo-1′-phenyl-5′-hydroxypregn - 4 - eno - [3,2 - c]pyrazole of Formula V.

Formation of the 17-α acyloxy groups, generally alkanoyloxy, is accomplished by initial formation of 17α,21-(α-alkoxy - alkylidenedioxy) derivative, i.e., orthoester, throught treatment of the free 17α,21-dihydroxy compound with an alkyl orthoformate in the presence of p-toluenesulfonic acid or pyridinium chloride. Hydrolysis of the resulting orthoester, as with hydrochloric acid at room temperature or by warming with oxalic acid, then generates the requisite free 17α-acyloxy-21-hydroxy compound.

Preparation of the 21-acyloxy derivatives is accomplished through treatment of a free 21-hydroxy compound with one molar equivalent of an acylating agent such as an acid anhydride or acid chloride, as for example acetic or propionoic anhydride in pyridine.

21-fluoro derivatives of the present invention are obtained by converting a 21-hydroxy compound to an alkyl or acyl sulfonate such as the mesylate or tosylate which is in turn treated with potassium fluoride.

The requisite starting materials for the present invention, namely those having the structure defined by Formula II, may be prepared in accordance with the procedures set forth in application Ser. No. 486,226 above. Briefly these procedures involve treatment of a 3-ketopregna-4,6-diene with soduim chlorodifluoroacetate in for example refluxing dimethyldiethylene-glycol ether so as to generate a 3-keto-6α,7α-difluoromethylene-pregn-4-ene. Hydroxy groups are often esterified in the course of this reaction and thus the principal recation is preferably followed by a brief alkaline hydrolysis. The dihydroxyacetone side chain of the starting material is protected through piror formation of the bismethylenedioxy group according to procedures known per se and this group may be carried through the subsequent steps described above leading to the compounds of the present invention.

A preferred group of compounds of the present invention are those of Formula I wherein $R^1$ is hydroxy or acyloxy, especially alkanoyloxy, $R^2$ is hydroxy, $R^3$ is α-methyl, $R^4$ is fluoro and $R^5$ is hydrogen.

The following examples will serve to further typify the nature of this invention but as these are presented solely for the purpose of illustration, they should not be construed as a limitation on the scope of this invention.

*Preparations*

To a solution of 5 g. of 16α-methylpregna-4,6-diene-11β,17α,21-triol-3,20-dione in 200 ml. of chloroform are added 40 ml. of 37% aqueous formaldehyde and 5 ml. of concentrated hydrochloric acid. This mixture is stirred for 48 hours at room temperature and the two layers are then separated. The aqueous layer is extracted with chloroform and the combined organic layer and chloroform extracts are washed with water to neutrality, dried over sodium sulfate and evaporated to dryness to yield 16α-methyl-17α,20;20,21-bismethylenedioxypregna - 4,6 - dien-11β-ol-3-one which is recrystallized from methanol:ether.

To a gently refluxing and stirred solution of 1 g. of 16α - methyl - 17α,20;20,21-bismethylenedioxypregna-4,6-dien-11β-ol-3-one in 8 ml. of dimethyldiethyleneglycol ether is added in a dropwise fashion over a two-hour period, a solution of 30 equivalents of sodium chlorodifluoroacetate in 30 ml. of dimethyldiethyleneglycol ether. At the end of the reaction period, which may be followed by the U.V. spectra, the mixture is filtered and evaporated in vacuo to dryness. The residue is added to 10% methanolic potassium hydroxide and this mixture is heated briefly at reflux and poured into ice water. The solid which forms is collected, washed with water, dried and chromatographed on alumina, eluting with methylene chloride, to yield 6α,7α-difluoromethylene-16α-methyl-17α,20;20,21-bismethylenedioxypregn-4-en-11β-ol-3-one.

In a similar fashion, starting with the corresponding 4,6-dienes, the following compounds are prepared:

6α,7α-difluoromethylene-16β-methyl - 17α,20;20,21 - bismethylene-dioxypregn-4-en-11β-ol-3-one;

6α,7α - difluoromethylene - 9α - fluoro - 16α - methyl-17α,20;20,21-bismethylenedioxypregn-4-en-11β - ol - 3-one;

6α,7α - difluoromethylene - 17α,20;20,21 - bismethylenedioxypregn-4-en-11β-ol-3-one; and 6α,7α-difluoromethylene - 9α - fluoro - 17α,20;20,21 - bismethylenedioxy-preg-4-en-11β-ol-3-one.

*Example 1*

A mixture of 5 g. of 6α,7α-difluoromethylene-16α-methyl - 17α,20;20,21-bismethylenedioxypregn-4-en-11β-ol-3-one, 100 ml. of anhydrous thiophene-free benzene, 10 ml. of ethyl oxalate and 1.5 g. of sodium hydride is stirred for 4 hours under nitrogen. After continuous addition of water and separation of the layers, the aqueous phase is acidified by the addition of sodium dihydrogen phosphate and extracted with chloroform. The chloroform layer is dried over sodium sulfate and concentrated in vacuo to yield 2-ethoxyoxalyl-6α,7α-difluoromethylene-16α-methyl-17α,20;20,21 - bismethylenedioxypregn-4-en-11β-ol-3-one which is recrystallized from acetone:hexane. This material is mixed with powdered glass and heated at from about 200 to 260° C. until the evolution of gas is complete. The mixture is extracted with methylene chloride and these extracts are evaporated to drynes to yield 2-carbethoxy-6α,7α-difluoromethylene-16α-methyl-17α,20;20,21 - bismethylenedioxypregn-4-en-11β-ol-3-one.

A mixture of 1 g. of 2-carbethoxy-6α,7α-difluoromethylene-16α-methyl-17α,20;20,21 - bismethylenedioxypregn-4-en-11β-ol-3-one and 1.2 equivalents of phenylhydrazine hydrochloride in 15 ml. of glacial acetic acid containing one equivalent of sodium acetate is refluxed for two hours under nitrogen. The reaction mixture is evaporated under reduced pressure and the product obtained is taken up in chloroform and washed successively with water, dilute acid, water, sodium bicarbonate and water and concentrated in vacuo. The product is redissolved in 50 ml. of methanol and 10 ml. of 1.33 N sodium methoxide in methanol. After being allowed to stand under nitrogen, the solution is neutralized with acetic acid, diluted with ethyl acetate, washed with water, and dried over sodium sulfate. Evaporation of the solvent then yields 1′-phenyl- 5′,11β - dihydroxy-6α,7α-difluoromethylene-16α - methyl-17α,20;20,21 - bismethylenedioxypregn-4-eno[3,2-c]pyrazole.

A suspension of 1 g. of 1′-phenyl-5′,11β-dihydroxy-6α, 7α-difluoromethylene-16α-methyl - 17α,20;20,21-bismethylenedioxypregn-4-eno[3,2-c]pyrazole in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane:ethyl acetate to yield 1′ - phenyl-5′,11β,17α,21-tetrahydroxy-6α,7α-difluoromethylene - 16α - methyl-20-oxopregn-4-eno[3,2-c]pyrazole.

Example 2

By separately substituting p-fluorophenylhydrazine, m-methoxyphenylhydrazine, p-chlorophenylhydrazine, p-methylphenylhydrazine, p-methoxphenylhydrazine and m-fluorophenlhydrazine for phenylhydrazine in the foregoing procedure, the following compounds are respectfully obtained:

1′-(4-fluorophenyl)-5′,11β,17α,21-tetrahydroxy-6α,7α-difluoromethylene-16α-methyl-20-oxopregn-4-eno-[3,2-c]pyrazole;
1′-(3-methoxyphenyl)-5′,11β,17α,21-tetrahydroxy-6α,7α-difluoromethylene-16α-methyl-20-oxopregn-4-eno-[3,2-c]pyrazole;
1′-(4-chlorophenyl)-5′,11β,17α,21-tetrahydroxy-6α,7α-difluoromethylene-16α-methyl-20-oxopregn-4-eno-[3,2-c]pyrazole;
1′-(4-methylphenyl)-5′,11β,17α,21-tetrahydroxy-6α,7α-difluoromethylene-16α-methyl-20-oxopregn-4-eno-[3,2-c]pyrazole;
1′-(4-methoxyphenyl)-5′,11β,17α,21-tetrahydroxy-6α,7α-difluoromethylene-16α-methyl-20-oxopregn-4-eno-[3,2-c]pyrazole; and
1′-(3-fluorophenyl)-5′,11β,17α,21-tetrahydroxy-6α,7α-difluoromethylene-16α-methyl-20-oxopregn-4-eno-[3,2-c]pyrazole.

Example 3

By utilizing separately the corresponding steroidal starting material (prepared in accordance with the procedures described in the last paragraph of Preparation) in place of 6α,7α-difluoromethylene-16α-methyl-17α,20;20,-21-bismethylenedioxypregn-4-en-11β-ol-3-one in the procedure of Example 1, the following compounds are respectively obtained:

1′-phenyl-5′,11β,17α,21-tetrahydroxy-6α,7α-difluoromethylene-16β-methyl-20-oxopregn-4-eno[3,2-c]-pyrazole;
1′-phenyl-5′,11β,17α,21-tetrahydroxy-6α,7α-difluoromethylene-9α-fluoro-16α-methyl-20-oxopregn-4-eno-[3,2-c]pyrazole;
1′-phenyl-5′,11β,17α,21-tetrahydroxy-6α,7α-difluoromethylene-20-oxopregn-4-eno[3,2-c]pyrazole; and
1′-phenyl-5′,11β,17α,21-tetrahydroxy-6α,7α-difluoromethylene-9α-fluoro-20-oxopregn-4-eno[3,2-c]-pyrazole.

Example 4

A a solution of 1.5 g. of 1′-phenyl-5′,11β,17α,21-tetrahydroxy-6α,7α-difluoromethylene-20-oxopregn - 4 - eno-[3,2-c]pyrazole and 3 mg. of p-toluenesulfonic acid in 600 ml. of benzene is added in a dropwise fashion 1.2 g. of methylorthovalerate. The mixture is distilled until the volume is about 200 ml. and then neutralized with a few drops of pyridine and evaporated under vacuum. The residue is taken up with methanol to yield 1′-phenyl-5′, 11β - dihydroxy-6α,7α-difluoromethylene-17α,21-(1-methoxypent - 1,1 - ylidenedioxy)-20-oxopregn-4-eno[3,2-c]-pyrazole.

An ethereal solution of 1′-phenyl-5′,11β-dihydroxy-6α,-7α-difluoromethylene - 17α,21 - (1-methoxypent-1,1-ylidenedioxy)-20-oxopregn-4-eno[3,2-c]pyrazole is treated with a few drops of concentrated hydrochloric acid. The mixture is allowed to stand for one hour and is then washed with water, dried over sodium sulfate and evaporated to dryness to yield 1′-phenyl-5′,11β,21-trihydroxy-6α,7α-difluoromethylene-17α - pentanoyloxy-20-oxopregn-4-eno[3,2-c]pyrazole which is further purified through recrystallization from acetone:hexane.

Example 5

A mixture of 1 g. of 1′-phenyl-5′,11β,17α,21-tetrahydroxy-6α,7α-difluoromethylene-9α-fluoro - 16α - methyl-20-oxopregn-4-eno[3,2-c]pyrazole, 4 ml. of pyridine and a molar equivalent amount of acetic anhydride is allowed to stand at room temperature for 15 hours. The mixture is then poured into ice water and the solid which forms is collected by filtration, washed with water and dried to yield 1′-phenyl-5′,11β,17α-trihydroxy - 6α,7α - difluoromethylene - 9α - fluoro-16α-methyl-20-oxo-21-acetoxypregn-4-eno[3,2-c]pyraole which may be further purified through recrystallization from acetone:hexane.

Example 6

A mixture of 2 g. of 1′-phenyl-5′,11β,17α,21-tetrahydroxy - 6α,7α - difluoromethylene - 20 - oxopregn - 4-eno[3,2-c]pyrazole in 8 ml. of pyridine and a molar equivalent weight of adamantoyl chloride is heated at steam bath temperatures for one hour. The mixture is then poured into ice water and the solid which forms is collected by filtration, washed with water and dried to yield 1′ - phenyl - 5′,11β,17α - trihydroxy - 6α,7α - difluoromethylene - 20 - oxo - 21 - adamantoyl - oxypregn-4-eno[3,2-c]pyrazole which is further purified through recrystallization from methylene chloride:hexane.

Example 7

To a cooled solution of 3.4 g. of 1′-phenyl-5′,11β,17α, 21 - tetrahydroxy - 6α,7α - difluoromethylene - 9α - fluoro-16α - methyl - 20 - oxopregn - 4 - eno[3,2-c]pyrazole in 20 ml. of 9:1 chloroform:pyridine is added in small portions 1.4 g. of tosyl chloride. The reaction mixture is allowed to stand for 14 hours at 0° C. and is then washed with dilute hydrochloric acid, water and sodium bicarbonate solution. The chloroform is removed by evaporation under reduced pressure and the residue is dissolved in acetone. This acetone solution is added to a refluxing suspension of 10 g. of potassium fluoride in 50 ml. of dimethylformamide. After refluxing for 5 hours, the mixture is cooled and poured into water. The solid which forms is collected by filtration, dried and recrystallized from acetone and hexane to yield 1′-phenyl-5′,11β,17α-trihydroxy - 6α,7α - difluoromethylene - 9α,21 - difluoro-16α-methyl-20-oxopregn-4-eno[3,2-c]pyrazole.

Example 8

Seventy five milligrams of 1′-phenyl-5′,11β,17α,21-tetrahydroxy - 6α,7α - difluoromethylene - 9α - fluoro - 16α-methyl-20-oxo-4-eno[3,2-c]pyrazole is dissolved with stirring at 80° C. in 39.38 g. of propylene glycol. There is then added with stirring a filtered melt of 75 g. of stearic acid, 39 g. of Span 60, 7.5 g. of Span 80, 21 g. of Tween 60 and 375 mg. of propylparaben. There is next added a solution of 1.35 g. of methylparaben in 555 g. of sterile deionized water. The mixture is allowed to cool to a temperature of 25 to 30° C. while stirring is continued, solidification occurring at about 50° C. There is then slowly added with stirring, a solution of 75 mg. of anhydrous citric acid in 15.5 g. of sterile deionized water. The weight of this mixture is then adjusted to 750 g. with sterile deionized water to produce a 0.01% cream suitable for maintenance therapy and occlusive dressing therapy of various dermatoses.

By employing 187.5 mg. of the steroid in the foregoing procedure, a 0.025% cream is obtained, suitable for adjunctive therapy of acute or chronic dermatoses.

Example 9

Twenty five milligrams of 1'-(4-fluorophenyl)-5',11β,17α,21 - tetrahydroxy - 6α,7α - difluoromethylene - 16α-methyl-20-oxo-pregn-4-eno[3,2-c]pyrazole which has been milled on a ball mill to a particle size of under 10 microns, and 575 mg. of neomycin sulfate, similarly micronized, are added to 3.4 g. of white petrolatum, USP, which has been melted at a temperature of 50 to 55° C. This mixture is thoroughly mixed and passed through an Eppenbach colloid mill. The mill is then rinsed with 96 g. of melted white petrolatum which is divided into four portions. These rinsings are combined with the principal mixture and the entire bulk is stirred until it has attained room temperature. The resulting 0.05% ointment is suitable for treatment of inflammatory dermatoses complicated by infection where an emollient effect or lubrication is desirable.

Example 10

Ninety five milliliters of propylene glycol, USP, are heated at 90° C. for 20 minutes and then cooled to 60° C. In this liquid are dissolved with agitation 10 mg. of 1'-phenyl - 5',11β,17α,21 - tetrahydroxy - 6α,7α - difluoromethylene - 20 - oxopregn - 4 - eno[3,2-c]pyrazole and 10 mg. of anhydrous citric acid, USP. The volume of the resulting solution is adjusted to a total of 100 ml. with additional propylene glycol and allowed to attain temperature. The resulting 0.01% solution may be employed for the treatment of inflammatory dermatoses in intertriginous or hairy sites.

What is claimed is:

1. Compounds of the formula

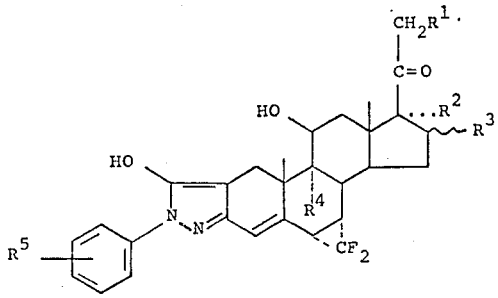

wherein $R^1$ is fluoro, hydroxy, or a hydrocarbon carboxylic acyloxy group of less than 12 carbon atoms;
$R_2$ is hydroxy or a hydrocarbon carboxylic acyloxy group of less than 12 carbon atoms;
$R^3$ is hydrogen or methyl;
$R^4$ is hydrogen or fluoro; and
$R^5$ is hydrogen, fluoro, chloro, methoxy or methyl.

2. Compounds according to claim 1 wherein $R^1$ is hydroxy or acyloxy; $R^2$ is hydroxy and $R^3$ is hydrogen or α-methyl.

3. Compounds according to claim 1 wherein $R^1$ is hydroxy or acyloxy; $R^2$ is hydroxy, $R^3$ is hydrogen, $R^4$ is hydrogen, and $R^5$ is hydrogen.

4. Compounds according to claim 1 wherein $R^1$ is hydroxy or acyloxy, $R^2$ is hydroxy, $R^3$ is hydrogen, $R^4$ is fluoro, $R^5$ is hydrogen.

5. Compounds according to claim 1 wherein $R^1$ is hydroxy or acyloxy, $R^2$ is hydroxy, $R^3$ is α-methyl, $R^4$ is hydrogen, and $R^5$ is hydrogen.

6. Compounds according to claim 1 wherein $R^1$ is hydroxy or acyloxy, $R^2$ is hydroxy, $R^3$ is α-methyl, $R^4$ is fluoro, and $R^5$ is hydrogen.

7. Compounds according to claim 1 wherein $R^1$ is hydroxy or acyloxy, $R^2$ is hydroxy, $R^3$ is hydrogen, $R^4$ is hydrogen and $R_5$ is p-fluoro.

8. Compounds according to claim 1 wherein $R^1$ is hydroxy or acyloxy, $R^2$ is hydroxy, $R^3$ is hydrogen, $R^4$ is fluoro, and $R_5$ is p-fluoro.

9. Compounds according to claim 1 wherein $R^1$ is hydroxy or acyloxy, $R^2$ is hydroxy, $R^3$ is α-methyl, $R^4$ is hydrogen and $R_5$ is p-fluoro.

10. Compounds according to claim 1 wherein $R^1$ is hydroxy or acyloxy, $R^2$ is hydroxy, $R^3$ is α-methyl, $R^4$ is fluoro and $R_5$ is p-fluoro.

References Cited
UNITED STATES PATENTS 3,325,480   6/1967   De Ruggieri et al. __ 260—239.5

LEWIS GOTTS, *Primary Examiner.*

H. FRENCH, *Assistant Examiner.*